United States Patent [19]
Mengel et al.

[11] Patent Number: 6,049,180
[45] Date of Patent: Apr. 11, 2000

[54] HIGH VOLTAGE REGULATED SUPPLY PARTICULARLY SUITED FOR VISUAL DISPLAYS

[76] Inventors: Edward M. Mengel, c/o Teltron Technologies, Birdsboro, Pa. 19508; Richard L. Kies, Jr., 9850 Roberts Rd., Sauquoit, N.Y. 13456

[21] Appl. No.: 09/004,655

[22] Filed: Jan. 8, 1998

[51] Int. Cl.[7] .................................................. H01J 29/70
[52] U.S. Cl. ............................................ 315/411; 363/91
[58] Field of Search ...................... 315/411; 324/117 R; 361/204; 363/91; 388/913; 396/206

[56] References Cited

U.S. PATENT DOCUMENTS

| | | |
|---|---|---|
| 3,694,764 | 9/1972 | Barron ..................................... 330/146 |
| 4,900,988 | 2/1990 | Yuk ......................................... 315/411 |
| 5,612,862 | 3/1997 | Marusik et al. ........................... 363/93 |

OTHER PUBLICATIONS

Attwood et al., "Highly Efficient, I Mega Hertz Magnetic Amplifier Requires Low Cost, Non–Square Loop Material," IEEE 1994.

Silva–Martínez, "A Switched Capacitor Double Voltage Generator," IEEE 1994.

*Primary Examiner*—Edward P. Westin
*Assistant Examiner*—John Patti
*Attorney, Agent, or Firm*—Zachary T. Wobensmith, III

[57] ABSTRACT

A supply is disclosed that develops a high dc voltage that may be applied to the anode of a cathode ray tube (CRT) of a display system. The supply provides the high dc voltage without the need for any high voltage flyback transformers and without the need of any power transistors. In one embodiment, the circuit of the invention is interposed between a subsystem of a power source of a horizontal deflection system, and the anode of the CRT.

10 Claims, 2 Drawing Sheets

HIGH VOLTAGE REGULATED SUPPLY PARTICULARLY SUITED FOR VISUAL DISPLAYS

BACKGROUND OF THE INVENTION

1.0 Field of the Invention

The present invention relates to a system for generating a high dc voltage, on the order of 7 Kv and more particularly, to a high voltage system devoid of high power rated transistors and high voltage flyback transformers and particularly suited to provide dc power to the anode of a cathode ray tube of a visual display systems, such as video monitors, displays and home television sets.

2.0 Description of the Prior Art

Visual display systems such as video monitors, displays, and home television sets include a horizontal-deflection system having circuitry for generating a high dc voltage, on the order of 7 Kv dc, that is applied to the anode of the cathode ray tube (CRT) of the visual display system. The high voltage generating circuits of the horizontal-deflection system currently use horizontal drive transistors and high voltage flyback transformers, both devices handling and consuming a relatively large amount of power. The usage of these high power devices poses a high risk of failure and parts fatigue due to the stressful high voltage level, and the transformer currents used in the flyback transformer's magnetic core, which contribute to the degradation or failure of the performance of the video display system over a period of time. It is desired that a high voltage generating circuit that supplies the high dc voltage to the anode of the CRT be provided by a system that is devoid of high power rated transistors and high voltage flyback transformers, all of which consume high power during their operation, which may lead to the failure of the visual display system.

OBJECTS OF THE INVENTION

It is a primary object of the present invention to provide a high dc voltage generating circuit that is devoid of specialized high power rated transistors and high voltage flyback transformers.

It is another object of the present invention to provide a high dc voltage generating circuit that is devoid of devices that consume high power yet that has good voltage regulation.

It is a further object of the present invention to provide a circuit that generates a high dc voltage in the range of about 7 Kv, and is coupled to the low voltage generating circuits of the horizontal-deflection system of the visual display system.

SUMMARY OF THE INVENTION

The present invention is directed to a circuit that provides a high dc voltage that may be applied to the anode of a cathode ray tube of a display system, and which is generated without the need of any high voltage flyback transformer, and without the need of any specialized high power rated transistors all handling and consuming high power.

In one embodiment the high dc voltage circuit is interposed between a subsystem of a low voltage power source of a horizontal-deflection system and the anode of the CRT.

The high voltage supply comprises means for coupling energy, reactance means, a magnetic amplifier, a voltage doubler, a voltage divider, an error amplifier, and a current source. The means for coupling energy supplies a dc output and is coupled to a circuit generating a low voltage. The reactance means receives the output of the coupling means and supplies a representative dc output thereof. The magnetic amplifier has a predetermined BH curve characteristic, an input winding, an output winding, and a control winding. The input winding receives the output winding, and a control winding. The input winding receives the output of the reactance means and the magnetic amplifier generates an output voltage across the output winding in response to the voltage applied to its control winding, and in accordance with the predetermined (BH) hysteresis curve. The voltage doubler receives the output of the magnetic amplifier and develops a dc output voltage that is connected to an anode of a cathode ray tube. The voltage divider is connected to the output of the voltage doubler, and provides a voltage output that is reduced relative to the output of the voltage doubler. The error amplifier has first and second inputs and develops an output which represents the difference between voltages applied to the first and second inputs. The first input is connected to a predetermined reference voltage, and the second input is connected to the reduced output voltage of a voltage divider. The current source has an input connected to the output of the error amplifier and an output connected to the control winding of the magnetic amplifier.

BRIEF DESCRIPTION OF THE DRAWINGS

These and other objects, features and advantages of the invention, as well as the invention itself, will become better understood by reference to the following detailed description when considered in conjunction with the accompanying drawings wherein like reference numbers designate identical or corresponding parts throughout and wherein.

DETAILED DESCRIPTION OF THE PREFERRED EMBODIMENTS

Figure 1:
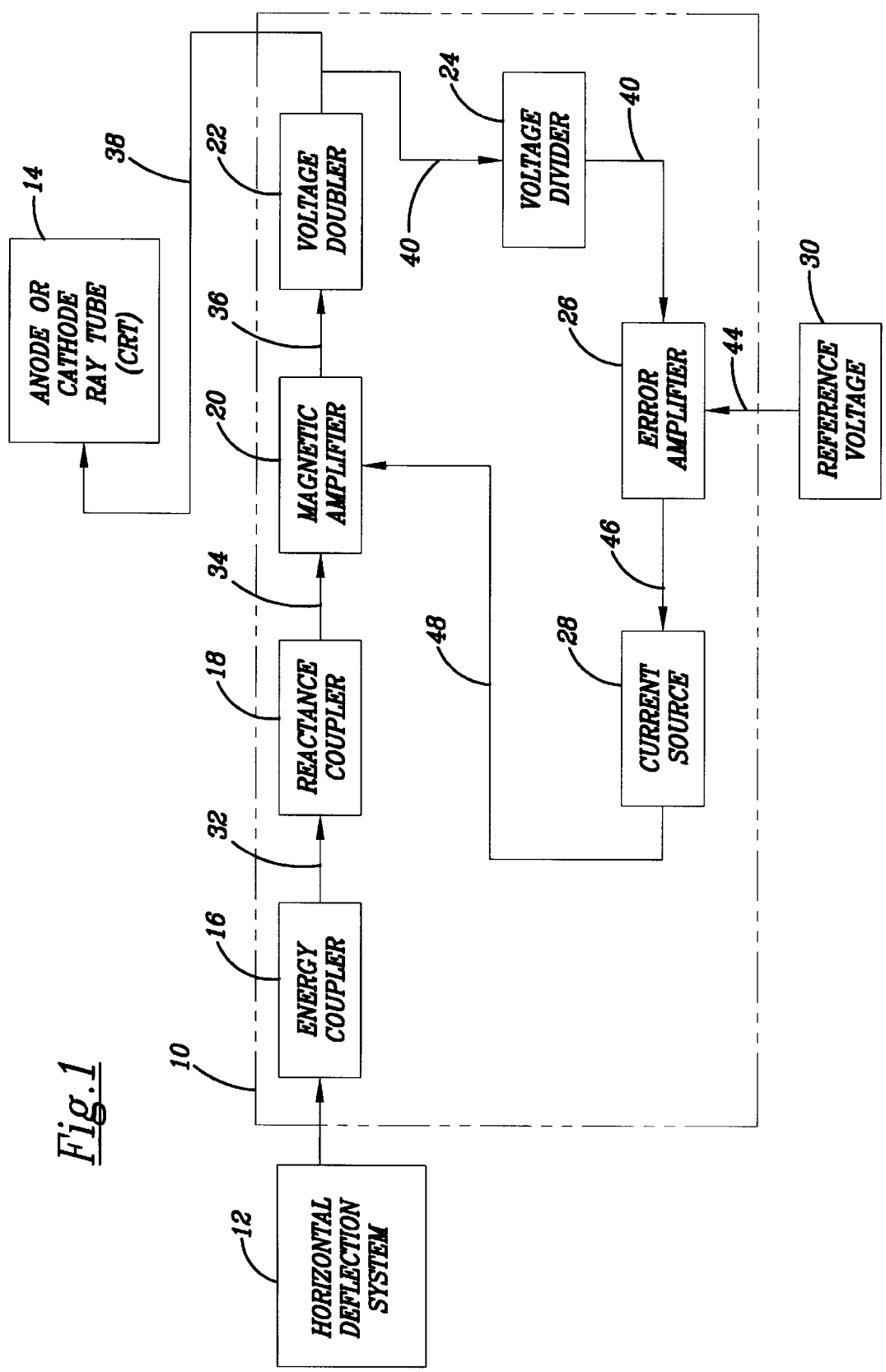
FIG. 1 is a block diagram of the system of the present invention for generating a high dc voltage.

Referring to the drawings, there is shown in FIG. 1 a block diagram of a system 10 operatively coupled to a horizontal deflection system of a visual display system, and generating a regulated dc high voltage that is applied to the anode 14 of a cathode ray tube (CRT) of a visual display system. The visual display system may be a video monitor, or a display in a home television set. The horizontal-deflection system 12 is well known and in addition to its primary function of beam deflection, the horizontal-deflection system 12 performs a number of auxiliary functions including generating secondary voltages that are routed to supplies in the display system, and also, the generation of a high dc voltage that is applied to the anode of a CRT of a video display system. This high dc voltage generating function typically provided by the horizontal-deflection system, is in accordance with the present invention, provided by the high dc voltage supply 10.

The present invention provides a regulated high dc voltage that is applied to the anode 14 of the cathode ray tube of the display system, and which is generated without the need of any high voltage flyback transformers, and without the need of any specialized transistors having a high power rating, and wherein both type of devices would otherwise handle and consume high amounts of power. The high dc voltage supply 10 comprises a plurality of elements given in Table 1 and receives a predetermined reference voltage supply 30.

TABLE 1

| REFERENCE NO. | TYPICAL VALUE/TYPE |
| --- | --- |
| 16 | Energy Coupler |
| 18 | Reactance Coupler |
| 20 | Magnetic Amplifier |
| 22 | Voltage Doubler |
| 24 | Voltage Divider |
| 26 | Error Amplifier |
| 28 | Current Source |

In general, the energy coupler 16 serves as means for coupling energy from the output circuitry of the horizontal deflection system 12 that generates the secondary or low voltages that are routed throughout the visual display system associated with the horizontal-deflection system 12. The energy coupler 16 generates a dc output 32 representative of the received energy. The reactance coupler 18 receives the dc output 32 and supplies a representative output 34 that is routed to magnetic amplifier 20.

The magnetic amplifier 20 operates in accordance with its predetermined hysteresis (BH) curve, as will be further described with reference to FIG. 2, and has an input winding, an output winding, and a control winding. The input winding receives the dc output 34, and the magnetic amplifier 20 generates an output voltage 36 across the output winding in response to a control voltage applied to its control winding, and in accordance with its predetermined (BH) hysteresis curve.

The voltage doubler 22 receives the output voltage 36 and develops a dc output 38 that is connected to the anode 14 of the cathode ray tube. The output of the voltage doubler 22 is also connected to the voltage divider 24, via signal path 40. The voltage divider 24 provides an output voltage on signal path 42 that is routed to error amplifier 26, and which is reduced relative to the dc output voltage 38 of the voltage doubler 22.

The error amplifier 26 has first and second inputs, and develops an output which represents the difference between the voltages applied to the first and second inputs. The first input is connected, via signal path 44, to a predetermined reference voltage provided by the reference voltage supply 30. The second input is connected, via signal path 42, to the reduced output of the voltage divider 24. The output of the error amplifier 26 is routed to a current source 28 via signal path 46. The current source 28 provides an output voltage 48 that is routed to the control winding of the magnetic amplifier 20. The detail operation of the high dc voltage generator 10 may be further described with reference to FIG. 2.

Figure 2:
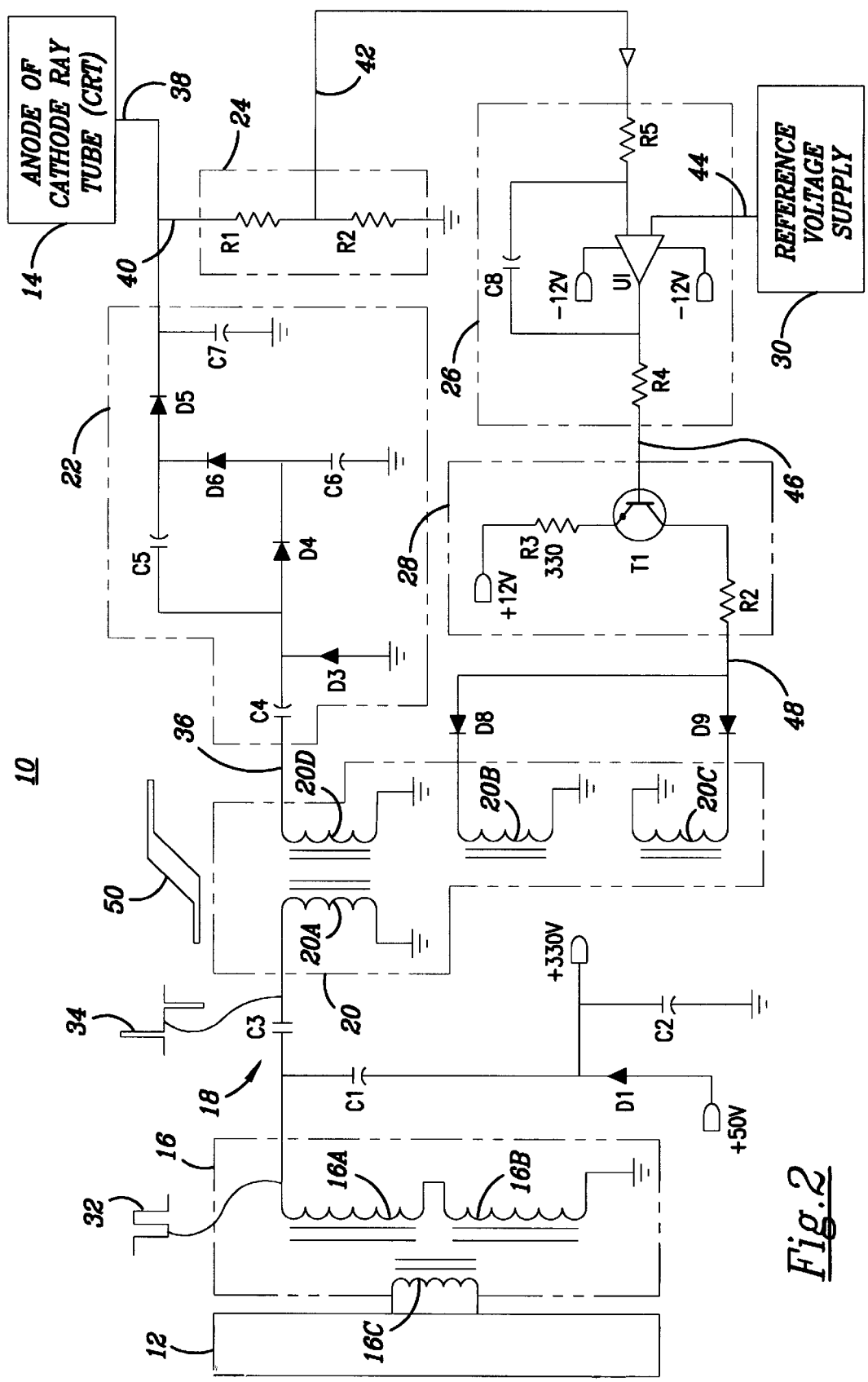
FIG. 2 is a circuit diagram of the system of FIG. 1.

FIG. 2 illustrates the energy coupler 16 as comprising at least one secondary winding 16A, but preferably two secondary windings 16A and 16B of a transformer that operatively transfers electrical energy from the primary winding 16C of the transformer located at the output stage of the horizontal-deflection system, in particular, to the output stage of the horizontal-deflection system that develops the secondary voltages that are routed to the other elements of the display system. The energy coupler 16 samples a portion of the dc to dc power waveform, and which portion is illustrated by the square wave signal 32 of FIG. 2 which is routed to the reactance couplers 18.

As seen in FIG. 2, a filtering network comprised of capacitors C1 and C2 having typical values of 0.4 $\mu f$, and diodes D1 and D2 of types 1N5416 and 1N5420, all arranged as shown, is interposed between the energy coupler 16 and the reactance coupler 18. The diode D1 has its anode connected to a positive excitation, such as +50 V D.C., and the diode D2 has its cathode connected as +330 V DC Grid 2 supply voltage source. This network therefore supplies a charge pumped low voltage 330 V DC supply for Grid 2 of the CRT.

The reactance coupler 18 may comprise a capacitor C3 having a preferred value of 0.01 $\mu f$ and preferably having a value in the range of about 0.047 $\mu f$ to about 0.22 $\mu f$. The reactor C3 transfers its output voltage, shown as spike pulses 34, to the magnetic amplifier 20. The capacitor C3 is selected so as to provide a reactance to the frequency of the dc to dc square wave 32 that determines the amount of energy coupled to the input winding 20A of the magnetic amplifier 20. If desired, the reactance means 18 may be provided by an inductor having a value in the range from 250 $\mu H$ to 350 $\mu H$.

The magnetic amplifier 20 is known in the art and has a predetermined (BH) hysteresis curve 50. The effective pulse width present in the core of the magnetic amplifier 20 is determined by the (BH) hysteresis curve 50, which is varied by a dc bias provided by the current source 30, preferably via diodes D8 and D9, and connected across the control windings 20B and 20C of the magnetic amplifier 20. The magnetic amplifier 20 provides an output voltage 36 across its output winding 20D that is routed to the voltage doubler 22, known in the art, comprised of a plurality of elements arranged as shown in FIG. 2 and given in Table 2 along with a typical value/type thereof.

TABLE 2

| REFERENCE NO. | TYPICAL VALUE/TYPE |
| --- | --- |
| D3 | SM100 |
| D4 | SM100 |
| D5 | SM100 |
| D6 | SM100 |
| C4 | .001 $\mu f$ |
| C5 | .001 $\mu f$ |
| C6 | .001 $\mu f$ |
| C7 | .001 $\mu f$ |

The voltage doubler 22 supplies a dc voltage 38 having a typical value of 7 Kv, that is about twice the peak value of the output voltage 36 across output winding 20D. The dc voltage 38 is connected to the anode 14 of the cathode ray tube of the visual display system. The output of the voltage doubler 22 is also routed, via signal path 40, to the voltage divider 24 comprising resistors R1 and R7 having typical values of 100 M$\Omega$ and 51 k$\Omega$, respectively, and arranged as shown in FIG. 2.

The voltage divider 24 provides an output, having a typical value of 5 V dc, that is routed, via signal path 42, to error amplifier 36 comprised of a plurality of elements having a value/type given in Table 3 and arranged as shown in FIG. 2.

TABLE 3

| COMPONENT | TYPICAL VALUE/TYPE |
| --- | --- |
| U1 | LM741 |
| R4 | 5.1 K$\Omega$ |
| R5 | 1 M$\Omega$ |
| C8 | 0.1 $\mu f$ |

The error amplifier 26 has first and second inputs, with the first input receiving a voltage that is reduced by the voltage divider 24, and the second input receiving a predetermined reference voltage, such as 5 V d.c., developed by reference voltage generator 30. The error amplifier 26 generates an output voltage 46, which is routed to current generator 28 comprised of a transistor T1 and resistors R1 and R2 having respective values of 100 and 30 ohms and arranged as shown.

The operation of the error amplifier 26 primarily provides for the regulation of the 7 Kv dc output developed by the voltage doubler 22. More particularly, the error amplifier 26 provides an output voltage 46 that is the difference between the voltages on its first and second inputs, and which is routed to the current generator 28, which in turn, applies a corresponding dc bias voltage, serving as a control voltage 48, across the control winding 20B and 20C so as to increase or decrease the output voltage 36 of the magnetic amplifier 20 in accordance with the difference voltage applied to the inputs of the error amplifier 26. The increasing or decreasing of the output voltage 36 continues until the difference voltage applied to the error amplifier is substantially zero, which corresponds to the regulated dc output voltage 38 of the voltage doubler being substantially 7 Kv.

It should now be appreciated that the practice of the present invention provides for a high dc voltage supply 10 that generates a regulated high dc voltage on the order of 7 Kv that is applied to the anode of a cathode ray tube. The high voltage supply 10 is devoid of power transistors, and high voltage flyback transformers, that would otherwise handle and consume relatively high amounts of power, and which would otherwise contribute to the premature failure of the display system in which they find usage.

Although the present invention illustrates the high dc voltage supply 10 as being interposed between the horizontal deflection system 12 and the anode 14 of the cathode ray tube of both of the visual display systems, the practice of the present invention contemplates that the supply 10 of the present invention may find usage in other applications that require the need of relatively high dc voltages, and which voltages are generated without the need of power transistors, or without high voltage flyback transformers.

It is understood that the invention is not limited to the specific embodiments herein illustrated and described but may be otherwise without departing from the spirit and the scope of the invention.

What is claimed is:

1. In a visual display system having a horizontal deflection system with circuitry for generating a low dc voltage and having a cathode ray tube with an anode requiring a high dc voltage, said visual display system having a high voltage supply comprising:
   (a) means for coupling energy from said circuitry generating said low dc voltage and supplying a representative dc output thereof;
   (b) reactance means receiving said output of said coupling means and supplying a representative dc output thereof;
   (c) a magnetic amplifier having a predetermined (BH) hysteresis curve and input, output, and control windings, said input winding receiving said output of said reactance means, and said magnetic amplifier generating an output voltage across said output winding in response to a control voltage applied to said control winding, and in accordance with said predetermined (EH) hysteresis curve;
   (d) a voltage doubler receiving said output of said magnetic amplifier and developing a dc output voltage that is connected to said anode of said cathode ray tube;
   (e) a voltage divider connected to said dc output voltage of said voltage doubler, and providing a dc output voltage that is reduced relative to said dc output voltage of said voltage doubler;
   (f) an error amplifier having first and second inputs, and developing an output which represents the difference between voltages applied to said first and second inputs, said first input being connected to a predetermined reference voltage, and said second input being connected to said reduced output voltage of said voltage divider; and
   (g) a current source having an input connected to said output of said error amplifier, and an output connected to said control winding of said magnetic amplifier.

2. In a visual display system according to claim 1, wherein said reactance means comprises a capacitor having a value in the range from about 0.047 $\mu f$ to about 0.22 $\mu f$.

3. In a visual display system according to claim 1, wherein said reactance means comprises an inductor having a value in the range from about 250 $\mu H$ to about 350 $\mu H$.

4. In a visual display system according to claim 1, wherein said means for coupling energy is at least one secondary winding of a transformer whose primary winding is at the output stage of said circuitry generating said low dc voltage, and said low dc voltage comprises a DC to DC square wave.

5. In a visual display system according to claim 1, wherein said current source further comprises first and second diodes interconnecting said output of said current source to said control winding of said magnetic amplifier.

6. A high dc voltage supply comprising:
   (a) means for coupling energy from a circuitry generating a low dc voltage and supplying a representative dc output thereof;
   (b) reactance means receiving said output of said coupling means and supplying a representative dc output thereof;
   (c) a magnetic amplifier having a predetermined (BH) hysteresis curve and input, output, and control windings, said input winding receiving said output of said reactance means, and said magnetic amplifier generating an output voltage across said output winding in response to a control voltage applied to said control winding, and in accordance with said predetermined (BH) hysteresis curve;
   (d) a voltage doubler receiving said output of said magnetic amplifier and developing dc output voltage;
   (e) a voltage divider connected to said dc output voltage of said voltage doubler, and providing a dc output voltage that is reduced relative to said dc output voltage of said voltage doubler;
   (f) an error amplifier having first and second inputs, and developing an output which represents the difference between voltages applied to said first and second inputs, said first input being connected to a predetermined reference voltage, and said second input being connected to said reduced output voltage of said voltage divider; and
   (g) a current source having an input connected to said output of said error amplifier, and an output connected to said control winding of said magnetic amplifier.

7. The high voltage supply according to claim 6 wherein said reactance means comprises a capacitor having a value in the range from about 0.047 $\mu f$ to about 0.22 $\mu f$.

8. The high voltage supply according to claim 6, wherein said reactance means comprises an inductor having a value in the range from about 250 $\mu H$ to about 350 $\mu H$.

9. The high voltage supply according to claim 6, wherein said means for coupling energy is at least one secondary winding of a transformer whose primary winding is at the output stage of said circuitry generating said low dc voltage.

10. The high voltage supply according to claim 6, wherein said current source further comprises first and second diodes interconnecting said output of said current source to said control winding of said magnetic amplifier.

* * * * *